3,175,977
LIQUID DETERGENT COMPOSITIONS
Luther H. Smithson, Jr., El Cerrito, and Oliver K. Moore, Richmond, Calif., assignors to California Research Corporation, San Francisco, Calif., a corporation of Delaware
No Drawing. Filed Mar. 13, 1962, Ser. No. 179,476
5 Claims. (Cl. 252—152)

This invention relates to the preparation of aqueous detergent compositions. More particularly, the invention has to do with the preparation of a liquid detergent concentrate based on a unique combination of alkylbenzene sulfonate, urea, and water, and to solutions of the concentrate further diluted with water to give an end-use solution having low cloud points and good viscosity characteristics. The invention is useful in dishwashing and light-duty laundering applications.

According to one embodiment of the invention, concentrated aqueous solutions of the following constitution are contemplated, the percentages being by weight:

(1) 25 to 50 percent of a mixture of sodium and ammonium sulfonates of alkylbenzenes having a molecular weight between about 215 and 250, the weight ratio of the sodium alkylbenzene sulfonate to the ammonium alkylbenzene sulfonate ranging from about 60:40 to 90:10, and preferably, 70:30 to 80:20.
(2) 2 to 30 percent urea, preferably 4 to 12, and
(3) The remainder water.

The amount of urea varies with the molecular weight of the alkylbenzene sulfonate. Thus, with the higher molecular weight materials an amount of urea is employed at the upper end of the range. With the lower molecular weight alkylbenzene sulfonates, the proportions of urea are at the lower end of the urea concentration range.

In addition, the liquid detergent concentrate can contain conventional amounts of auxiliary agents, such as foam boosters, coloring matter, and perfume. Other inert ingredients, for example, inorganic sulfates, such as sodium and ammonium sulfates, can be present in an amount ranging from 5 to 25 percent, by weight, based on total organic sulfonate and sulfate.

The foregoing composition is in a convenient and economical form for selling and shipping and is adapted for further dilution with water to produce the solution ultimately desired. Further dilution of the concentrate can be effected by simple addition of water thereto. End-use solutions can accordingly be constituted as follows, the percentages again being by weight:

(1) A mixture of sodium and ammonium sulfonates of alkylbenzenes having a molecular weight within about the range 215–250, the weight ratio of sodium alkylbenzene sulfonate to ammonium alkylbenzene sulfonate ranging from about 60:40 to 90:10, 5 to 20%;
(2) Urea, 1 to 5%; and
(3) The remainder water.

As already indicated, the end-use solution can contain auxiliary agents and inert fillers.

The foregoing diluted solutions can then be used in concentrations of 0.1 to 0.4 percent in the water used for washing dishes or the laundering of fabrics.

As the alkylbenzene components employed in making the sodium and ammonium alkylbenzene sulfonates herein contemplated, it is preferred to use those in which the alkyl groups are derived from propylene polymer, having an average molecular weight between about 215 and 250. It is also known that upon sulfonation of the alkylbenzene, inorganic salt formation is concomitant. Thus, an amount of sodium and ammonium sulfate ranging from 5 to 25 weight percent of the sulfonates and sulfates is often present along with the organic sulfonate. However, the presence of the inorganic sulfate is not deleterious.

The end-use solutions of the present invention have low cloud points, i.e., do not become turbid or clouded or form layers of precipitated matter. The solutions of the present invention will have cloud points of the order of 0° C. or low enough to remain clear under most severe changes of temperature encountered on use. Cloud point is simply determined by slowly cooling and stirring the solution and observing the temperature at which the solution turns cloudy.

Even the concentrated form of the compositions contemplated herein remain clear over a range of 10° C. to 30° C. This permits the transportation and receipt of the compositions without having to resort to drastic measures to keep them from becoming turbid or to separate into phases.

Another important feature of the compositions prepared in accordance with the present invention is their high viscosity. A high viscosity is not only desired by the ultimate user, but equipment for its use often requires viscosity controls. In general, the present end-use compositions have viscosities ranging from 20 centistokes to 90 centistokes at 25° C.

The invention is illustrated by the following examples:

EXAMPLE 1

*Preparation of concentrated liquid detergent solution*

A 50 gallon kettle equipped with a mechanical stirrer, inlet port, and cooling coils is charged with 35.9 parts of water. During the processing, the temperature is maintained at 100–110° F. by the proper adjustment of the cooling water flow rate. Stirring is commenced and 9.0 parts of concentrated sodium hydroxide (45 percent by weight, in water) is added. Next, 12.5 parts of aqueous ammonia (10 percent by weight) is added. Powdered urea, 12 parts, is added through the port, and the resulting slurry is stirred until all of the urea is in solution. Finally, there is added a mixture of sulfonic acid and sulfuric acid, containing 28.2 and 2.4 parts of acid, respectively, and prepared by the oleum sulfonation of polypropylene benzenes, having an average molecular weight of 246. The pH of the solution is 6.5–7.0 after the addition of these acids. As a result, there is obtained a mixture having the following composition in percent by weight:

Sodium polypropylene benzene sulfonate _____ 22.5
Ammonium polypropylene benzene sulfonate _____ 7.5
Urea _____ 12.0
Sodium sulfate _____ 2.5
Ammonium sulfate _____ .9
Water _____ 54.6

This concentrate has a viscosity of 430 centistokes at 25° C.

EXAMPLE 2

*Preparation of a dilute liquid detergent solution*

The product from Example 1 is mixed with 200 parts of water to give a solution containing 10 percent (by weight, based on total weight) of sodium/ammonium sulfonate, in a ratio of 75/25. This solution has a cloud point of 0.5° C. and a viscosity of 68 centistokes measured at 25° C.

EXAMPLE 3

*Preparation of sodium polypropylene benzene sulfonate*

Polypropylene benzene sulfonic acid is prepared by the oleum sulfonation of polypropylene benzene having a molecular weight of 246. After phase separation, the acid product contains some residual sulfuric acid. The mixture of acids is neutralized with a concentrated sodium hydroxide (12.5 percent by weight in water). The resulting slurry is analyzed and found to contain 40.1 percent, by weight, sodium polypropylene benzene sulfonate and 4.5 percent, by weight, of sodium sulfate.

EXAMPLE 4

*Preparation of ammonium polypropylene benzene sulfonate*

Example 3 is repeated, except that the mixture of acids is neutralized with aqueous ammonia (12.5 percent by weight). Analysis shows the product slurry to contain 31.1 percent (by weight) of ammonium polypropylene benzene sulfonate and 3.3 percent (by weight) of ammonium sulfate.

EXAMPLES 5–11

In these examples, various liquid detergent solutions are examined for cloud point and viscosity. These solutions are prepared by mixing the indicated amounts of sodium and ammonium polypropylene benzene sulfonate slurries, as above-prepared, with the indicated amounts of urea and water. The resulting mixture is stirred at room temperature until a clear solution is obtained. The results are given in Table I.

TABLE I.—LIQUID DETERGENTS MADE FROM INTERMEDIATE MOLECULAR WEIGHT ABS [1]

| Example | Composition | | | | Inspection | |
|---|---|---|---|---|---|---|
| | Sodium Slurry, Parts | Ammonium Slurry, Parts | Water, Parts | Urea, Parts | Cloud Point (° C.) | Viscosity (Ctsks. 25° C.) |
| 5 | 0 | 31.8 | 68.2 | 0 | 59.5 | |
| 6 | 25.0 | 0 | 75.0 | 0 | 19.4 | 165 |
| 7 | 18.8 | 8.0 | 73.2 | 0 | 34.6 | |
| 8 | 0 | 31.8 | 64.2 | 4.0 | 39.2 | |
| 9 | 25.0 | 0 | 71.0 | 4.0 | 14.4 | |
| 10 | 18.8 | 8.0 | 69.2 | 4.0 | 0.5 | 68.0 |
| 11 | 18.8 | 8.0 | 70.2 | 3.0 | 10.4 | 91.2 |

[1] Alkylbenzene sulfonate of Examples 3 and 4.

In Table I, Examples 5 and 6 illustrate the cloud points which are obtained on solutions of the ammonium salt alone and on the sodium salt alone. Example 7 shows the cloud point of a mixture of the two salts (75 parts sodium, 25 parts ammonium, by weight), a value intermediate between those of the single salt examples. Examples 8 and 9 illustrate the effect of adding urea (4 percent by weight, based on total weight) to the single species, ammonium and sodium, respectively. Both cloud points are lowered somewhat but are still not at the required 32° F. value (0° C.). In Example 10, the required cloud point is obtained with a mixture of ammonium and sodium polypropylene benzene sulfonate (in a 25/75 weight ratio) and urea (4 percent by weight, based on total weight). In this case, the intermediate salt mixture has a cloud point value far below the intermediate value predicted from the single salt values.

EXAMPLE 12

Mixtures of sodium polypropylene benzene sulfonate, 39.8 parts, and sodium sulfate, 4.4 parts, are prepared according to the process of Example 3, except that the polypropylene benzene has an average molecular weight of 239.

EXAMPLE 13

Mixtures of ammonium polypropylene benzene sulfonate, 29.4 parts, and ammonium sulfate, 3.6 parts, are prepared by the process of Example 12, except that the polypropylene benzene has an average molecular weight of 239.

EXAMPLES 14–20

Liquid detergent solutions are made up of the sodium and ammonium polypropylene benzene sulfonates of Examples 12 and 13 as in Examples 5–11. The results are given in Table II.

TABLE II.—LIQUID DETERGENTS MADE FROM LOW MOLECULAR WEIGHT ABS [1]

| Example | Composition | | | | Inspection | |
|---|---|---|---|---|---|---|
| | Sodium Slurry, Parts | Ammonium Slurry, Parts | Water, Parts | Urea, Parts | Cloud Point (° C.) | Viscosity (Ctsks. 25° C.) |
| 14 | 0 | 34.0 | 66.0 | 0 | 38.8 | |
| 15 | 25.0 | 0 | 75.0 | 0 | 13.3 | 3.8 |
| 16 | 19.0 | 8.7 | 72.3 | 0 | 14.0 | 12.1 |
| 17 | 0 | 34.0 | 64.0 | 2.0 | 29.0 | |
| 18 | 25.0 | 0 | 73.0 | 2.0 | 11.0 | |
| 19 | 19.0 | 8.7 | 70.3 | 2.0 | −2.2 | 4.8 |
| 20 | 19.0 | 8.7 | 70.8 | 1.5 | 0.5 | 5.6 |

[1] Alkylbenzene sulfonate of Examples 12 and 13.

The data in Table II also show the synergistic effect that urea (1.5 percent by weight in Example 20, and 2.0 percent by weight in Example 19) has on the cloud point of solutions of mixed sodium and ammonium polypropylene benzene sulfonates (75/25 weight ratio, respectively).

EXAMPLE 21

Mixtures of sodium polypropylene benzene sulfonate, 38.7 parts, and sodium sulfate, 4.3 parts, are prepared by the process of Example 3, except that the polypropylene benzene has an average molecular weight of 267.

EXAMPLE 22

Mixtures of ammonium polypropylene benzene sulfonate, 27.2 parts, and ammonium sulfate, 3.0 parts, are prepared by the process of Example 21, except that the polypropylene benzene has an average molecular weight of 267.

EXAMPLES 23–26

Liquid detergent solutions are made up of the sodium and ammonium polypropylene benzene sulfonates of Examples 21 and 22, as in Examples 5–11. The results are given in Table III.

TABLE III.—LIQUID DETERGENTS MADE FROM HIGH MOLECULAR WEIGHT ABS [1]

| Example | Composition | | | | Inspection—Cloud Point (° C.) |
|---|---|---|---|---|---|
| | Sodium Slurry, Parts | Ammonium Slurry, Parts | Water, Parts | Urea, Parts | |
| 23 | 0 | 36.8 | 59.2 | 4.0 | 74.5 |
| 24 | 23.8 | 0 | 72.2 | 4.0 | 32.6 |
| 25 | 19.4 | 9.2 | 67.4 | 4.0 | 49.5 |
| 26 | 13.0 | 18.4 | 64.6 | 4.0 | 60.5 |

[1] Alkylbenzene sulfonate prepared as in Examples 21 and 22.

The data in Table III indicate that urea has no synergistic effect on the cloud point of solutions of mixed ammonium and sodium polypropylene benzene sulfonates when the average molecular weight of the alkyl benzene is greater than 250.

EXAMPLE 27

Mixtures of sodium polypropylene benzene sulfonate, 44.8 parts, and sodium sulfate, 5 parts, are prepared by the process of Example 3, except that the polypropylene benzene has an average molecular weight of 258.

EXAMPLE 28

Mixtures of ammonium polypropylene benzene sulfonate, 24.7 parts, and ammonium sulfate, 2.7 parts, are prepared by the process of Example 27, except that the polypropylene benzene has an average molecular weight of 259.

EXAMPLES 29-32

Liquid detergent solutions are made up of the sodium and ammonium polypropylene benzene sulfonates of Examples 27 and 28, as in Examples 5–11. The results are given in Table IV.

TABLE IV.—LIQUID DETERGENT MADE FROM HIGH MOLECULAR WEIGHT ABS [1]

| Example | Composition | | | | Inspection—Cloud Point (° C.) |
|---|---|---|---|---|---|
| | Sodium Slurry, Parts | Ammonium Slurry, Parts | Water, Parts | Urea, Parts | |
| 29 | 0 | 40.2 | 55.8 | 4.0 | 63.0 |
| 30 | 22.4 | 0 | 73.6 | 4.0 | 9.0 |
| 31 | 16.8 | 10.0 | 69.2 | 4.0 | 29.0 |
| 32 | 11.2 | 20.0 | 64.8 | 4.0 | 45.0 |

[1] Alkylbenzene sulfonate prepared as in Examples 27 and 28.

Again the data (as in Table III) show no synergistic effect of urea upon the cloud point for mixtures of sodium and ammonium polypropylene benzene when the average molecular weight of the alkyl benzene exceeds a value of 250.

EXAMPLE 33

Polypropylene benzene sulfonic acid is prepared by the oleum sulfonation of polypropylene benzene having a molecular weight of 246. After phase separation the acid product contains some residual sulfuric acid. The mixture of acids is neutralized with a concentrated potassium hydroxide (~15% by weight, in water) solution. The resulting slurry contains 38.8 percent, by weight, potassium polypropylene benzene sulfonate, and 4.2 percent by weight of potassium sulfate.

A solution is prepared by mixing 19.3 parts of this potassium sulfonate/sulfate slurry with 8.0 parts of ammonium sulfonate/sulfate slurry of Example 4. To this mixture there are added 68.7 parts of water and 4 parts of urea. The solution has a cloud point of 43.6° C. The value for the corresponding sodium/ammonium salt solution is 0.5° S. (see Table I, Example 10). This comparison points up the beneficial effects of a mixed sodium/ammonium salt upon the cloud point, compared to other alkali metal/ammonium salts.

We claim:
1. A liquid detergent concentrate adapted upon dilution with water to give an aqueous liquid detergent solution having a low cloud point, said concentrate consisting essentially of, by weight, 25 to 50 percent of a mixture of sodium and ammonium sulfonates of alkylbenzenes having a molecular weight between about 215 and 250, 2 to 30 percent urea, and the remainder water, the weight ratio of the sodium alkylbenzene sulfonate to the ammonium alkylbenzene sulfonate ranging from about 60:40 to 90:10.

2. A liquid detergent concentrate according to claim 1, wherein the weight ratio of the sodium alkylbenzene sulfonate to the ammonium alkylbenzene sulfonate ranges from about 70:30 to 80:20 and the amount of urea, from about 4 to 12 percent.

3. A liquid detergent concentrate according to claim 1 in which there is present inorganic ammonium and sodium sulfate in an amount ranging from 5 to 25 percent, by weight, based on inorganic sulfate and organic sulfonate.

4. An aqueous detergent solution consisting essentially of a mixture of sodium and ammonium sulfonates of alkylbenzenes having a molecular weight between about 215 and 250, urea, and water, the aforesaid ingredients being present based on the finished compositions in the following weight proportions: mixture of alkylbenzene sulfonates, 5 to 20 percent; urea, 1 to 5 percent; and the remainder, water; the weight ratio of the sodium alkylbenzene sulfonate to ammonium alkylbenzene sulfonate ranging from about 60:40 to 90:10.

5. An aqueous detergent solution according to claim 4 in which there is present in addition inorganic ammonium and sodium sulfate in an amount ranging from 5 to 25 weight percent, based on inorganic sulfate and organic sulfonate.

References Cited in the file of this patent
UNITED STATES PATENTS

| | | |
|---|---|---|
| 2,908,651 | Grifo | Oct. 13, 1959 |
| 2,947,702 | Coskie | Aug. 2, 1960 |
| 2,969,329 | Heininger | Jan. 24, 1961 |
| 3,001,948 | Clippinger | Sept. 26, 1961 |
| 3,042,623 | Greene | July 3, 1962 |